United States Patent
Khandekar et al.

(10) Patent No.: US 6,173,354 B1
(45) Date of Patent: Jan. 9, 2001

(54) METHOD AND APPARATUS FOR DECOUPLING INTERNAL LATENCIES OF A BUS BRIDGE FROM THOSE ON AN EXTERNAL BUS

(75) Inventors: Narendra Khandekar; Zohar Bogin, both of Folsom; Steve Clohset, Sacramento, all of CA (US)

(73) Assignee: Intel Corporation, Santa Clara, CA (US)

( * ) Notice: Under 35 U.S.C. 154(b), the term of this patent shall be extended for 0 days.

(21) Appl. No.: 09/205,255

(22) Filed: Dec. 4, 1998

(51) Int. Cl.[7] .................................................. G06F 13/00
(52) U.S. Cl. .......................... 710/129; 710/126; 710/107; 710/118; 710/125; 710/220
(58) Field of Search ...................................... 710/129, 126, 710/128, 105, 107, 109, 113, 118, 125, 240, 220; 711/146

(56) References Cited

U.S. PATENT DOCUMENTS

| | | | |
|---|---|---|---|
| 5,070,443 | * 12/1991 | Priem et al. .......................... | 710/105 |
| 5,448,742 | * 9/1995 | Bhattacharya ........................ | 711/154 |
| 5,734,856 | * 3/1998 | Wang ..................................... | 712/219 |
| 5,748,914 | * 5/1998 | Barth et al. ........................... | 710/105 |

OTHER PUBLICATIONS

International Search Report, PCT/US99/26728, 4 pages.

* cited by examiner

*Primary Examiner*—Ario Etienne
(74) *Attorney, Agent, or Firm*—Blakely, Sokoloff, Taylor & Zafman LLP

(57) ABSTRACT

A method and apparatus for decoupling internal latencies of a bus bridge from those on an external bus is described. In one embodiment, the method includes detecting a write cycle by an initiator for transmitting data to a device. The method further includes asserting a write request to the device, responsive to detecting the write cycle, asserting a ready request to the initiator without detecting an acknowledge from the device, and receiving the data from the initiator.

19 Claims, 4 Drawing Sheets

METHOD AND APPARATUS FOR DECOUPLING INTERNAL LATENCIES OF A BUS BRIDGE FROM THOSE ON AN EXTERNAL BUS

BACKGROUND OF THE INVENTION

1. Field of the Invention

The present invention relates generally to bus bridges, and specifically, to a method and apparatus for decoupling internal latencies of a bus bridge from those on an external bus.

2. Background Information

In a typical computer system, a central processing unit or microprocessor, on a host bus, is coupled to system memory and one or more devices on a secondary bus by way of a bus bridge. The bus bridge bridges transactions between the microprocessor, one or more devices on the secondary bus, and the system memory. The bus bridge also decouples the microprocessor from activities between the system memory and the secondary bus. When the microprocessor attempts a write cycle to, for example, system memory, it waits for the assertion of target ready (TRDY#) by the bus bridge before initiating the transfer of data on the host bus. The P6 Bus Protocol, Revision 4, published in August 1995 by Intel® Corporation of Santa Clara, Calif., allows for the assertion of TRDY#, at the earliest, four clock cycles from the beginning of the cycle. When the bus bridge is the target of a microprocessor initiated write cycle, it has to take the following actions before it can assert TRDY# on the host bus: (i) Decode the cycle and determine its destination; (ii) assert a request to the destination unit and wait for a response back from that destination unit; and (iii) if the destination unit is capable of accepting the data, assert TRDY# on the host bus. At 100 Mhz, for example, the response from the destination unit can be received, at the earliest, in T4. This pushes out the assertion of TRDY# to T5 and, subsequently, the data transfer is pushed out by a clock relative to the earliest possible transfer point. It would be desirable to minimize the amount of latency involved in such a cycle.

SUMMARY OF THE INVENTION

The present invention comprises a method and apparatus for decoupling internal latencies of a bus bridge from those on an external bus. In one embodiment, the method includes detecting a write cycle by an initiator to transmit data to a device, asserting a write request to the device, responsive to detecting the write cycle, and asserting a ready request to the initiator without detecting an acknowledge from the device. The method further includes receiving the data from the initiator.

DETAILED DESCRIPTION

Figure 1:
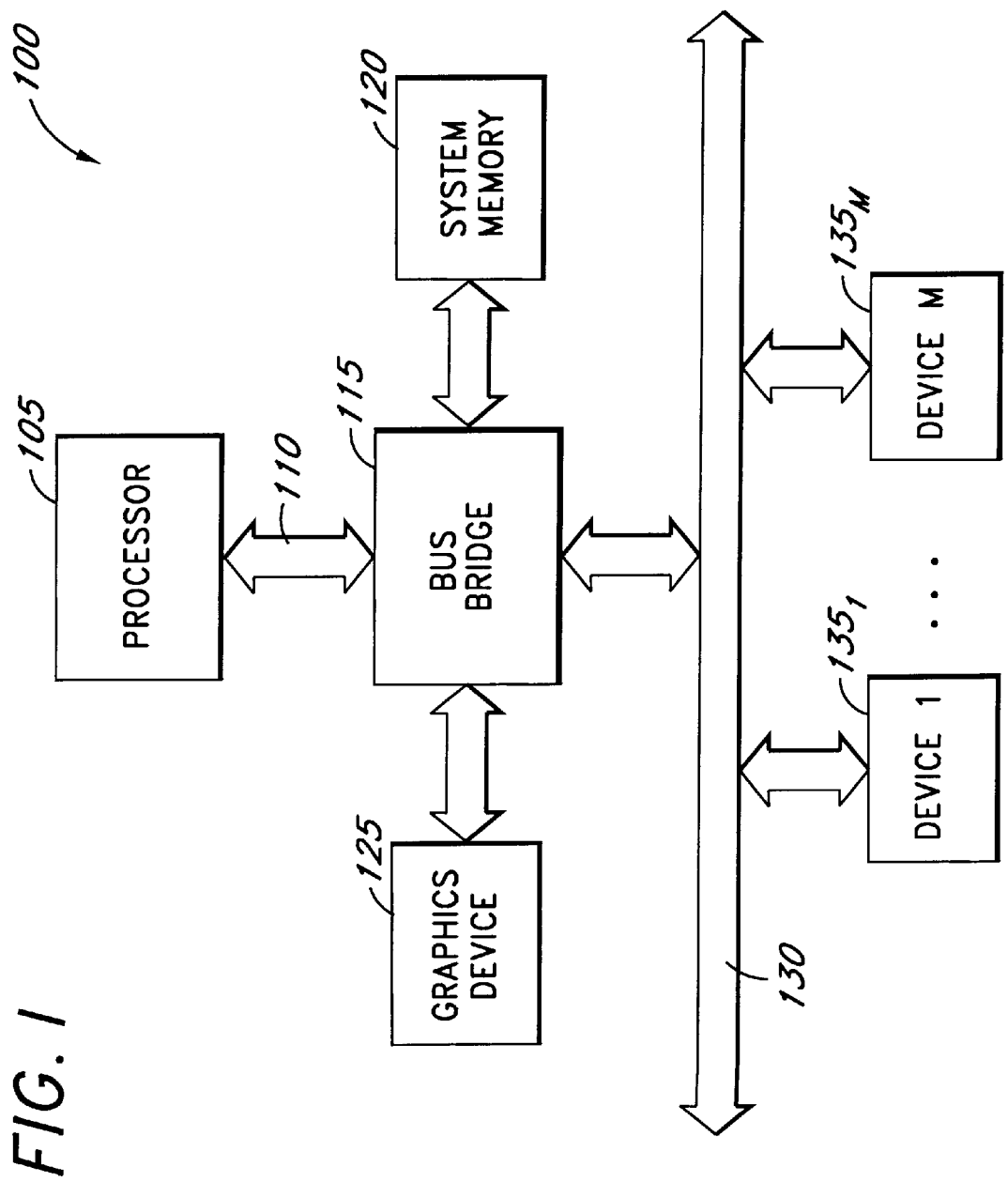
FIG. 1 illustrates an exemplary block diagram of a computer system suitable for use with the present invention.

FIG. 1 illustrates an exemplary block diagram of a computer system 100 suitable for use with the present invention. The computer system 100 includes a processor 105 coupled to a bus bridge 115 by way of host bus 110. The processor 105 represents a central processing unit of any type of architecture, such as a CISC, RISC, VLIW, or hybrid architecture. In addition, the processor 105 could be implemented on one or more chips. The bus bridge 115 is coupled to system memory 120 (e.g., dynamic random access memory "DRAM", static RAM "SRAM", etc.), a graphics device 125 (by way of an Accelerated Graphics Port), and one or more devices $135_1$-$135_M$ (e.g., a network interface card, a SCSI controller card, etc.), where "M" is a positive whole number, on a secondary bus 130. The bus bridge 115 is responsible for bridging processor transactions to system memory 120, secondary bus 130, or graphics device 125. The bus bridge 115 also bridges graphics device 125 initiated transactions or mastered transactions on the secondary bus 130 to the system memory 120 while initiating processor cache snoop cycles. The secondary bus 130 represents one or more busses (e.g., PCI, ISA, X-Bus, EISA, VESA, etc.) and bridges (also termed as bus controllers). While this embodiment is described in relation to a single processor computer system, the invention could be implemented in a multi-processor computer system.

Figure 2:
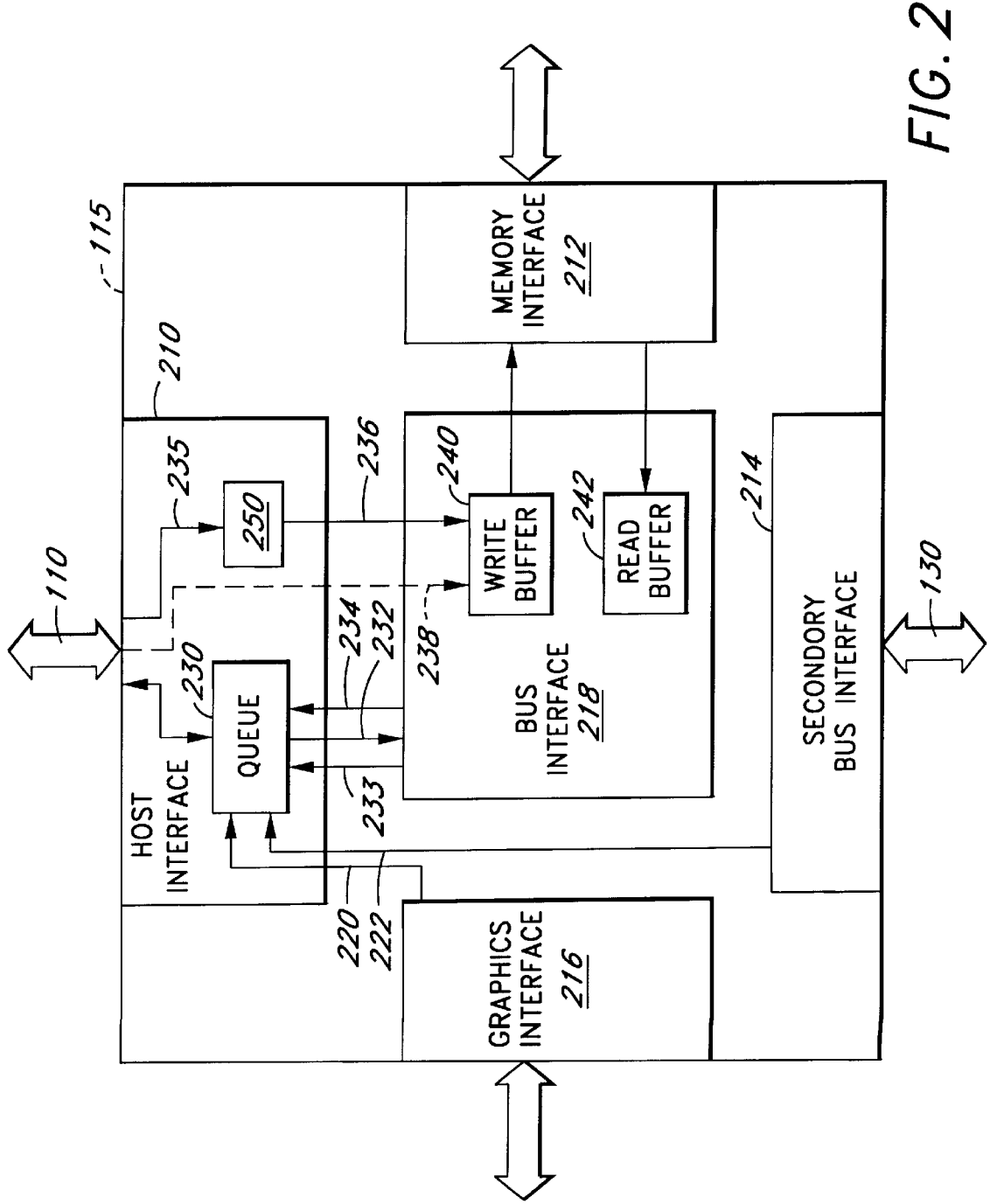
FIG. 2 illustrates a block diagram of the bus bridge of FIG. 1 according to one embodiment of the present invention.

As discussed herein, a "computer system" is a product including circuitry capable of processing data. The computer system may include, but is not limited or restricted to, a conventional computer (e.g., laptop, desktop, palmtop, server, mainframe, etc.), hard copy equipment (e.g., printer, plotter, scanner, fax machine, etc.), banking equipment (e.g., an automated teller machine), wireless communication equipment, and the like. FIG. 2 illustrates a block diagram of the bus bridge 115 of FIG. 1 according to one embodiment of the present invention. Referring to FIGS. 1 and 2, the bus bridge 115 includes a host interface 210 coupled to microprocessor 105 by way of the host bus 110, a memory interface 212 coupled to the system memory 120, a secondary bus interface 214 coupled to the secondary bus 130, a graphics interface 216 coupled to the graphics device 125, and a bus interface 218. The host interface 210 decodes microprocessor-initiated cycles and directs the requests to the appropriate interface(s) (e.g., the bus interface 218). The host interface 210 includes a queue 230 which stores and sequences requests initiated by the microprocessor 105 for access to the system memory 120. The queue 230 also stores and sequences requests initiated on the graphics interface 216 and the secondary bus interface 214, which are destined to the system memory 120. Transactions initiated on the graphics interface 216 or the secondary bus interface 214 which are targeted to the system memory 120 are routed to the queue 230 by way of signal lines 220 and 222, respectively. This allows transactions that are initiated on the graphics interface 216 or the secondary bus interface 214 to snoop the microprocessor 105, maintaining data coherency. The queue 230 is coupled to the bus interface 218 which controls and prioritizes accesses to the system memory 120.

The bus interface 218 is coupled to the memory interface 212 for funneling requests initiated on the one or more interfaces (and destined to the system memory 120) to the memory interface 212. The memory interface 212 initiates cycles for writing data to and reading data from the system memory 120. The bus interface 218 includes a write buffer 240 and a read buffer 242 and their corresponding control circuitries (not shown). The write buffer 240 is a first-in, first-out type buffer which stores write cycle requests destined to the system memory 120. The write buffer 240 transmits the write cycle requests to the memory interface 212 as fast as the memory interface 212 can accept such requests. The read buffer 242 is a first-in, first-out type buffer which stores read cycle requests retrieved from the system memory 120 and destined to the one or more interfaces.

The host interface 210 generates and controls a write request ("WREQ") handshake signal on signal line 232 which is coupled to the bus interface 218. The bus interface 218 generates and controls an acknowledge ("ACK") handshake signal and a retry ("RTRY") handshake signal on signal lines 233 and 234, respectively, which are coupled to the host interface 210. The WREQ signal is asserted to initiate a write cycle, destined to system memory 120, to the bus interface 218. The bus interface 218 checks the status of the write buffer 240 and determines whether there is enough space to accept data. Once it is determined that there is enough space in the write buffer 240, the bus interface 218 asserts the ACK signal, indicating that it is ready to receive data. Thereafter, data is transmitted from the microprocessor 105, by way of host bus 110, to the write buffer 240, as shown by dashed line 238 (dashed line indicates prior art technique). If the bus interface 218 does not have enough space in the write buffer 240, the bus interface 218 asserts the RTRY signal, indicating to the host interface 210 to retry the transaction.

Figure 3:
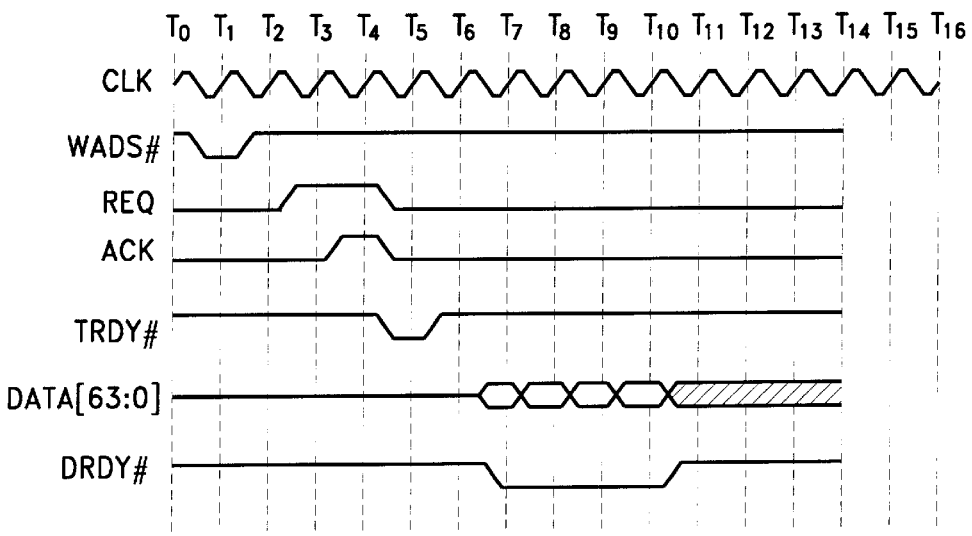
FIG. 3 illustrates a timing diagram of the data and control signals involved in writing data from the microprocessor to the write buffer.

FIG. 3 illustrates a prior art timing diagram of the data and control signals involved in writing data from the microprocessor 105 to the write buffer 240. Referring to FIG. 3, at time T0, the microprocessor 105 initiates a cycle, destined to the system memory 120, by asserting the ADS# signal. At the rising edge of T1, the host interface 210 detects and decodes the cycle (by checking the read/write signal and the address on the host bus 110, not shown), and places the request in the queue 230. For discussion purposes, the cycle is assumed to be a write cycle of four quadwords or 32 bytes of data. As a result, the queue 230 asserts the WREQ signal at time T2. At the rising edge of time T3, the bus interface 218 detects the assertion of the WREQ signal. The bus interface 218 then determines whether there is enough space in the write buffer 240 for the write data. If the bus interface 218 can accept the write data, it will assert the ACK signal, typically in T3. On the other hand, if the bus interface 218 cannot accept the write request (e.g., the write buffer 240 has reached a high water mark), the bus interface 218 will assert the RTRY signal (not shown in timing diagram) causing the host interface 210 to retry the transaction. Assuming that the ACK signal is asserted in T3, the queue 230 detects the assertion of the ACK signal at the rising edge of T4. In T4, the host interface 210 asserts the TRDY# signal on the host bus 110, indicating that it is ready to receive data from the microprocessor 105. At the rising edge of T5, the microprocessor detects the TRDY# assertion. In T6, the microprocessor 105 asserts the DRDY# signal and drives valid data on the host bus 110, indicating to the host interface 210 that valid data is on the host bus 110. The data is then read by the host interface and transmitted to the write buffer 240 from T7 to T10.

Thus, using the mechanism described above, the earliest time that the host interface 210 would be able to assert TRDY# is in T4, which is detected by the microprocessor 105 at the rising edge of T5. In addition, the earliest time that data would be received from the microprocessor 105 is in T7.

Once potential mechanism for decreasing latency is to provide a second write buffer in the host interface 210, alleviating the need for the microprocessor 105 to wait for the bus interface 218 to assert the ACK signal. This approach is problematic because there are many requests that are asserted to the bus interface 218 (e.g., from other interfaces) such that subsequent read requests would require an address comparison in the second write buffer to maintain data coherency. The additional write buffer also duplicates the logic that is already inside the bus interface 218, adds overall delay for the comparison, and increases the latency for reads.

The present invention provides a method and apparatus for minimizing the amount of latency involved, without incurring the drawbacks of duplicate hardware and extra latency, by decoupling the internal latencies of the bus bridge 115 from those on the host bus 110. This is achieved by providing a temporary buffer 250 (in lieu of dashed line 238) inside the host interface 210 (FIG. 2) for storing temporary data, destined for the system memory 120. The temporary buffer 250 receives data from the host bus 110 on signal lines 235 and transmits data to the write buffer 240 on signal lines 236. The temporary buffer 250 may be a register file or other type of memory device. In one embodiment, the temporary buffer can store four quadwords or thirty-two bytes of data (which is a cache line of data), although it may be of a different size. For each quadword of data, the temporary buffer includes a valid bit, indicating whether the quadword of data is valid.

Thus, by including the temporary buffer 250, the host interface 210 asserts the TRDY# signal at the earliest possible time, which, in the P6 Bus Protocol, is four clocks from the beginning of a clock cycle (T3). When the microprocessor 105 initiates a write cycle, the host interface 210 asserts TRDY# in T3, without determining whether the bus interface 218 is capable of accepting the data. The bus interface 218 provides this information, in most cases, in T4. Consequently, the microprocessor 105 is released and decoupled a clock earlier than in the system of the prior art.

Figure 4:
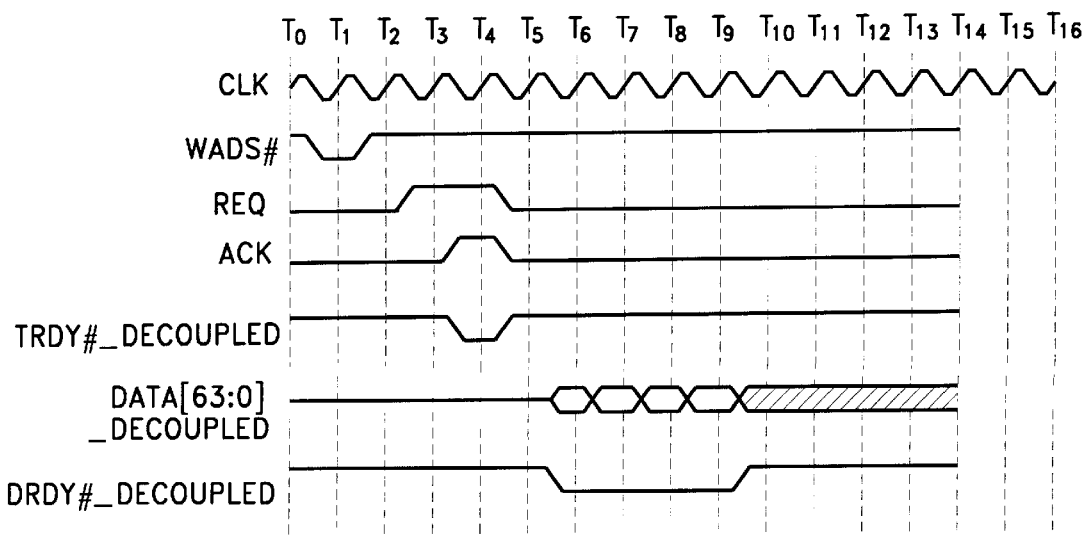
FIG. 4 illustrates a timing diagram of the data and control signals involved for efficiently writing data from the microprocessor to the write buffer according to one embodiment of the present invention.
Figure 5:
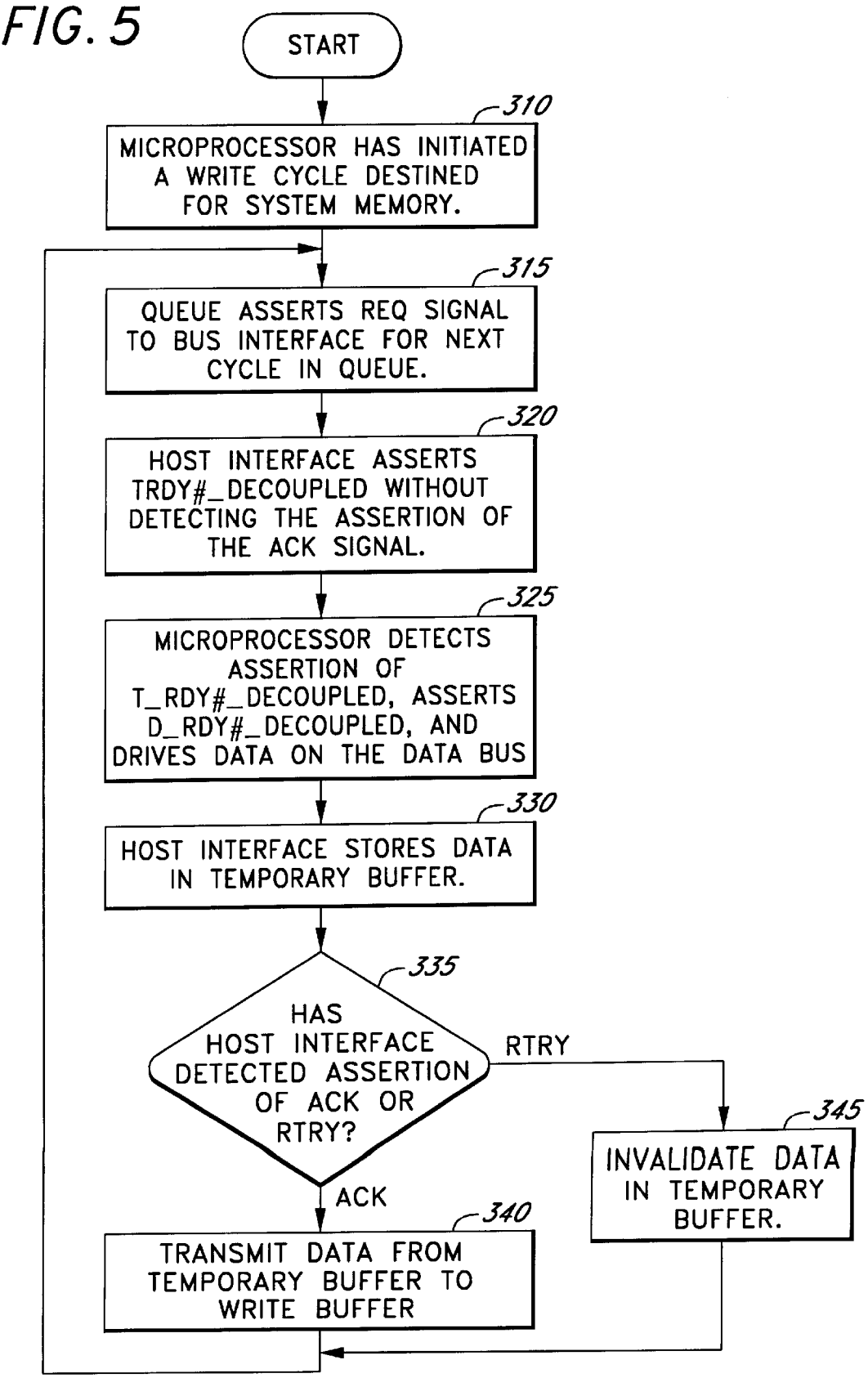
FIG. 5 is a flow diagram illustrating a process according to one embodiment of the present invention.

FIG. 4 illustrates a timing diagram of the data and control signals involved for efficiently writing data from the microprocessor 105 to the write buffer 240 according to one embodiment of the present invention. Note that the word "_decoupled" at the end of a signal indicates that the signal is decoupled from the internal latencies of the bus bridge 115. FIG. 5 is a flow diagram illustrating a process 300 according to one embodiment of the present invention. Referring to FIGS. 4 and 5, at time T0, the microprocessor 105 initiates a write request, destined to the system memory 120, by asserting the ADS# signal (read/write and address signals not shown) on the host bus 110. This is shown in block 310 of FIG. 5. The host interface 210 decodes the write request and places the request in the queue 230. At time T2, the queue 230 asserts the WREQ signal to transmit data to the write buffer 240. This is shown in block 315 of FIG. 5. In clock T3, the host interface 210 asserts the TRDY#_decoupled signal to indicate that it is ready to receive the data from the microprocessor 105, notwithstanding the fact that the host interface 218 has not detected the assertion of the ACK signal. This is shown in block 320 of FIG. 5.

At the rising edge of T4, the microprocessor 105 detects the assertion of TRDY#_decoupled, and, in T5, asserts DRDY#_decoupled and drives valid data on the host bus 110. This is shown in block 325. Starting from T6 to T9, the host interface 210 stores the data in the temporary buffer 250 and sets the valid bits of the corresponding quadwords of data, as shown by block 330. Thus, the microprocessor 105 is released a clock cycle earlier than shown in FIG. 3.

At block 335, it is determined whether the host interface 210 has detected the assertion of the ACK or RTRY signals. If the bus interface 218 has space in the write buffer 240 to receive data, then the bus interface 218 will assert the ACK signal, at the earliest, in T3 (and the host interface 210 detects the ACK signal in T4). Note in T3, that the ACK signal may be asserted by the bus interface 218 before, contemporaneously with, or after the host interface 210 asserts the TRDY#_decoupled signal. If the ACK signal is asserted, the process 300 moves to block 340, where the data in the temporary buffer 250 is transmitted to the write buffer 240 and the data is retired in the temporary buffer 250. If the RTRY signal is asserted, indicating to the host interface 210 to retry the transaction, the process moves the block 345, where to valid bits for the data in the temporary buffer 250 are marked as invalid and the cycle has to be retried.

However, the write buffer 240 is designed with a depth that is sufficient for the expected system activity. Thus, the occurrence that the bus interface 218 may not have space in the write buffer 240 is a very infrequent event. Consequently, the technique of the present invention saves a clock cycle for each write access from the microprocessor 105 to the memory array 120, freeing up the microprocessor 105 a clock cycle earlier to perform other tasks.

In an alternative embodiment, the write buffer 240 and read buffer 242 are contained in the memory interface 212, in which case the memory interface 212 also performs the operations of the bus interface 218 as the latter is not needed. It must be noted that the present invention not only applies to write cycles initiated by the microprocessor, but also to any initiator on any other bus (e.g., secondary bus 130). The present invention is especially useful in multi-processor systems which require frequent write-back cycles to the system memory 120.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method, comprising:
    detecting a write cycle by an initiator to transmit data to a device;
    asserting a write request to the device, responsive to detecting the write cycle;
    asserting a ready request to the initiator without detecting an acknowledge from the device;
    detecting the ready request, by the initiator;
    transmitting the data, responsive to detecting the ready request; and
    receiving the data from the initiator.

2. The method of claim 1 further comprising storing the data in a temporary buffer.

3. The method of claim 2 further comprising receiving an acknowledge signal from the device.

4. The method of claim 3 further comprising transferring the data from the temporary buffer to the device.

5. The method of claim 1 further comprising marking the data in the temporary buffer as invalid if a retry is received in lieu of the acknowledge.

6. The method of claim 1 wherein the initiator is a microprocessor.

7. The method of claim 1 wherein the device is a bus interface.

8. A method comprising:
    detecting a write cycle in a first clock by an initiator to transmit data;
    asserting a write request to a device in a second clock, responsive to detecting the write cycle;
    asserting a ready request to the initiator in a third clock without detecting an acknowledge response from the device;
    detecting the ready request, by the initiator in a fourth clock;
    transmitting the data in the fourth clock, responsive to detecting the ready request; and
    receiving the data from the initiator.

9. The method of claim 8 further comprising storing the data in a temporary buffer.

10. The method of claim 8 further comprising receiving the acknowledge response from the device in the third clock.

11. A system, comprising:
    a bus;
    a device to initiate a write cycle on the bus, to detect a ready request and to transmit data on the bus in response to the ready request; and
    an interface coupled to the device by way of the bus, the interface including
    a first circuit to transmit an acknowledge in response to a write request, and
    a second circuit coupled to the first circuit, the second circuit to (i) detect the write cycle on the bus, (ii) assert the write request to the first circuit for transmitting data to the first circuit, responsive to detecting the write cycle, (iii) assert a ready request on the bus to the device without detecting an acknowledge from the first circuit, and (iv) receive data from the device.

12. The system of claim 11 wherein the device is a microprocessor.

13. The system of claim 11 wherein the second circuit includes a temporary buffer for storing data received from the device.

14. The system of claim 13 wherein the second circuit to transmit the data from the temporary buffer to the first circuit, responsive to receiving an acknowledge.

15. A machine-readable medium having stored thereon data representing sequences of instructions which when executed by a machine, cause the machine to perform operations, comprising:
    detecting a write cycle by an initiator to transmit data to a device;
    asserting a write request to the device, responsive to detecting the write cycle;
    asserting a ready request to the initiator without detecting an acknowledge from the device;
    detecting the ready request, by the initiator;
    transmitting the data, responsive to detecting the ready request; and
    receiving the data from the initiator.

16. The medium of claim 15 wherein the instructions for comprise instructions causing the machine to perform operations comprising storing the data in a temporary buffer.

17. The medium of claim 16 wherein the instructions further comprise instructions causing the machine to perform operations comprising receiving an acknowledge signal from the device.

18. The medium of claim 17 wherein the instructions further comprise instructions causing the machine to perform operations comprising transferring the data from the temporary buffer to the device.

19. The medium of claim 15 wherein the instructions further comprise instructions causing the machine to perform operations comprising marking the data in the temporary buffer as invalid if a retry is received in lieu of the acknowledge.

* * * * *